United States Patent
Staffel et al.

[15] 3,659,047
[45] Apr. 25, 1972

[54] DEVICE FOR PRINTING THE ELEVATION COORDINATES ON A MAP

[72] Inventors: Hans Staffel, Gundwaldstr.12,6092, Kelsterbach/M; Dieter Isenburg, Jahnstr.17,6051, Weiskirchen, both of Germany

[22] Filed: July 13, 1970

[21] Appl. No.: 54,129

[52] U.S. Cl.................................................178/36, 346/79
[51] Int. Cl. ................................H04L 15/24, H04l 17/16
[58] Field of Search ....................346/79; 178/4.1, 15, 28, 36

[56] References Cited

UNITED STATES PATENTS 3,034,125   5/1962   Gonzenbach............................346/79
3,317,660   5/1967   Simms....................................178/4.1

Primary Examiner—Kathleen H. Claffy
Assistant Examiner—William A. Helvestine
Attorney—Waters, Roditi, Schwartz & Nissen

[57] ABSTRACT

A device for the continuous and automatic transmission and indication of the elevation coordinate at a cartographic location in a stereoscopic apparatus to an indicating device associated with a map, and wherein the measured value is introduced to a first motor by means of a commutator disc with contact plates. The motor is coupled to the indicating device and follows exactly the measured value from the commutator disc in both directions, the indicated value on the indicating device being printed upon a map by means of a second motor after closure of a switch.

16 Claims, 7 Drawing Figures

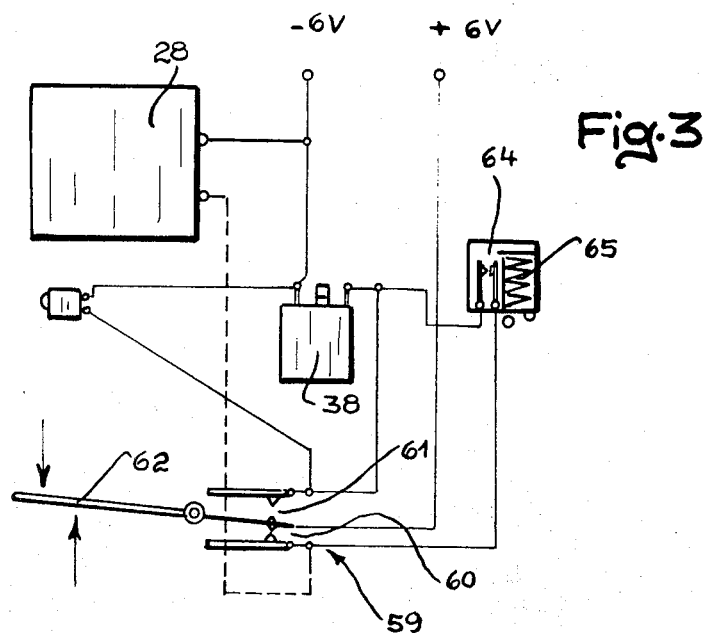
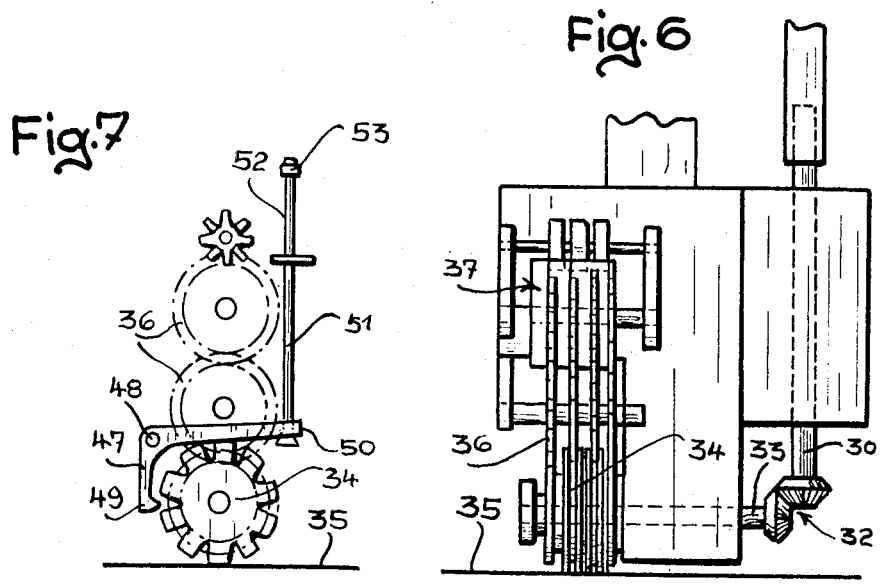

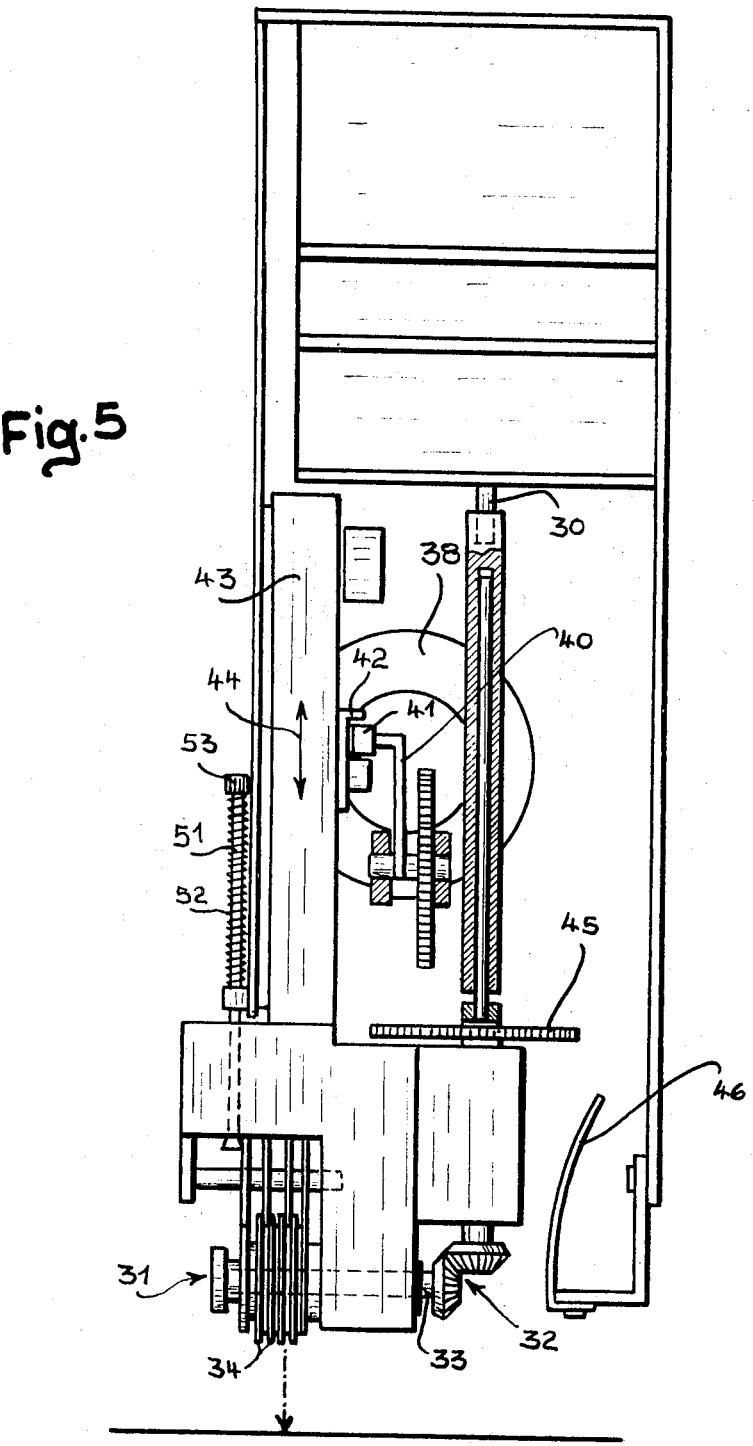

3,659,047

DEVICE FOR PRINTING THE ELEVATION COORDINATES ON A MAP

BRIEF SUMMARY OF THE INVENTION

The invention relates to apparatus for marking maps with elevation values and particularly to apparatus for transmitting measured elevation values to an indicating device associated with a map.

The apparatus according to the invention contemplates a device for the continuous and automatic indication and transmission to the indicating device of the elevation at a cartographic location as adjusted in a stereographic apparatus. Stereoscopic pictures of a landscape are taken, for instance, for use in such stereographic apparatus. These pictures are then observed in an observing device coupled with the stereographic apparatus wherein a stereoscopic image of the photographed object or landscape results from combination of these pictures.

A cartographic device may be attached to such stereoscopic apparatus, so that the locations precisely observed in the stereoscopic apparatus are transferred over to the map according to their $x$- and $y$-coordinates. Even the elevation coordinate $z$ may be measured in the stereoscopic apparatus as a result of the stereoscopic viewing by means of a calibrated measuring disc which changes the $z$-coordinate of the observed location.

Stereoscopic apparatus using aerial photos is known in which the adjusted elevation coordinate must be read in order to enter the measured value at the corresponding point on the neighboring map table, which point is cartographed, i.e., continuously carried over in its $x$- and $y$-coordinates. Thus, either two workers are needed, the first of whom adjusts the $z$-coordinates and the second enters the measured value on the map. It is also possible that the person operating the stereoscopic apparatus may enter the measured value himself. However, for this purpose, he must leave his working location and go to the map table. This known method is thus very complicated. Moreover, because of the need for various entries, mistakes can occur. Furthermore, the measuring process must be halted whenever the elevation coordinate of a location is entered.

The invention seeks to avoid these drawbacks. It is based upon the provision of a simple device by which the $z$-coordinates obtained in an evaluating apparatus are automatically entered on the map table. Consequently, human errors caused by manual entry of the values is avoided.

The invention contemplates the transmission of a measured elevation in a conventional stereoscopic apparatus via a rotatable commutator disc with contact plates to a first electromotor coupled with the indication device, which electromotor exactly follows the measured value on the commutator disc in both directions of rotation of the disc and wherein the value at the indicating device is printed upon the map, after a switch is closed, by a second electromotor. Thus, the value of the elevation coordinate, as adjusted in the stereoscopic apparatus, is transmitted via the commutator disc to an electromotor of the indicating device, which indicating device prints the value, as adjusted and calibrated, after the switch is closed by the operator. The operator does not even have to read the measured value. If a location on the map is to be provided with its $z$-coordinate, the operator only has to press a release button and the measured value is automatically printed beside this location. The commutator disc is directly coupled with the measuring device for the $z$-coordinate of the stereoscopic apparatus so that the adjusted measured values therefrom are continuously and automatically transmitted via the electromotor to the indicating device.

It is advantageous to provide the stereoscopic apparatus and the indicating device each with one commutator disc with contact plates, wherein both of the commutator discs are provided with a concentric cursor which delivers the voltage to the contact plates over sliding contacts. Hereby, the voltage is transmitted over the contact plates of the commutator disc associated with the stereoscopic apparatus to the corresponding contact plates of the receiving commutator disc whenever the cursor of the commutator disc of the stereoscopic apparatus is adjusted. Thus, voltage is transmitted to the first electromotor coupled to the cursor of the commutator disc over this cursor, whenever a difference exists between the desired and the present value. This electromotor subsequently turns a register of the printing head, which is coupled thereto.

The transmission of the rotating movement from the side of the stereoscopic apparatus to the side of the receiver is extremely sensitive, if the contact plates of the commutator disc of the stereoscopic apparatus are electrically connected to each other and placed at equal distances from each other. The commutator disc is provided, for instance, with a hundred contact plates at a certain perimeter in groups of 10 in each of 10 sectors. The contact plates of each group are numbered from 1 to 10. The contact plates with the same number of each group are then connected to each other and are connected by a cable to predetermined contact plates of the receiving commutator. This receiving commutator is also provided with 10 contact plates. In the described examples, all 10 of the contact plates of the stereoscopic apparatus commutator of the stereoscopic apparatus with position number II are positioned in the sectors II, III, IV and V of the receiving commutator. These four contact plates of the receiving commutator are positioned next to each other.

The cursor of the receiving commutator is advantageously provided at both its ends with two sliding contacts each of which corresponds to one direction of rotation of the first electromotor. If one of these sliding contacts touches one of the four current guiding contact plates, the electromotor is energized and it rotates in the desired direction until this sliding contact reaches a currentless contact plate of the receiving commutator. The electromotor stops and remains in this position. The evaluating apparatus, as for example a conventional register of a printing head, which is coupled with this electromotor, is disposed exactly in the position which is simultaneously indicated by the elevation measuring device of the stereoscopic apparatus. If a very steep landscape is to be measured by the stereoscopic apparatus, it appears to be sufficient that the elevation coordinate be given in whole values instead of in decimals. Therefore it is of an advantage if the commutator disc of the stereoscopic apparatus is provided with at least two circular rings with various divisions. In this case, a circular ring with a rough division is connected with the receiving commutator so that a full rotation of the receiving commutator corresponds to the shift of the elevation coordinate by 1 meter.

The above mentioned second electromotor brings about the actual printing operation after the switch is closed. The register of the printing head moves from a starting position to the printing position and back again. As the measured value is continuously transmitted by the first electromotor, the map can be stamped at each instant of time without additional measures. In order that the second electromotor does not stop its rotation movement which moves the printing head downwardly immediately after the operator ceases to press the switch button, a self holding circuit is provided for this second electromotor which holds it energized until the printing head has reached its starting position again.

The second electromotor drives a transmission gearing connected to a guiding stem with a fixed axis in order to obtain reciprocal movement. The guiding stem moves the printing head, guided by a rail, from the starting position to the printing position and back during one revolution of the guiding stem. Thereby an extremely simple transformation of a rotating movement of the second electromotor into forward and back movement of the printing head is achieved.

In order to achieve the self holding effect of the second electromotor, a change-over switch is provided which is activated at the beginning of the downward movement of the printing head and which holds the second electromotor energized until the printing head arrives at its starting position again. This change-over switch is also connected with the printing head, so that it stays activated as long as the printing head does not reach its starting position.

It is quite possible that the transmission of the measured values to the register has placed the register exactly in a position in which one of its numerals is exactly between two positions, so that this value is inexactly printed. In order to prevent this, a ratchet wheel is fastened to the axis of rotation of the register, and a resilient pin extends into the spaces in order to turn the axis of rotation to the correct printing position.

The register of the printing head may be, for instance, provided with three wheels with numerals. In order to bring these wheels with their numerals into the correct positions before each printing operation, a two-arm correcting lever is provided which moves the wheels of the register into their correct positions by means of a setting head connected with one of the arms of the lever, before the printing position is reached, whereby the other arm of the lever is moved by means of a guiding stem, the head of which moves upwardly, before the printing position is reached, by a springon the guiding stem, the lower end of which rests against the housing.

Below the register may be positioned a tiltable stamping pad which is removed during the printing process by means of a curved cam.

In order that the printed numerals occupy as little space on the map as possible, the wheels of the register may be advantageously driven by secondary wheels which effect setting of the decimals by means of a carrier. In this manner, the device for setting the decimals is at the wheels with the numerals. This is taken care of by the secondary wheels which are coupled with the wheels with the numerals.

BRIEF DESCRIPTION OF THE DRAWING

FIG. 3 is a diagrammatic showing of the arrangement of the printing mechanism,

FIG. 5 is a simplified sectional view of the device of FIG. 4, wherein some parts are omitted, FIG. 6 shows a detail of the register in a view corresponding to FIG. 5, and FIG. 7 shows a further feature of the indicating device in a sectional view corresponding to the view of FIG. 4.

DETAILED DESCRIPTION

Figure 1:
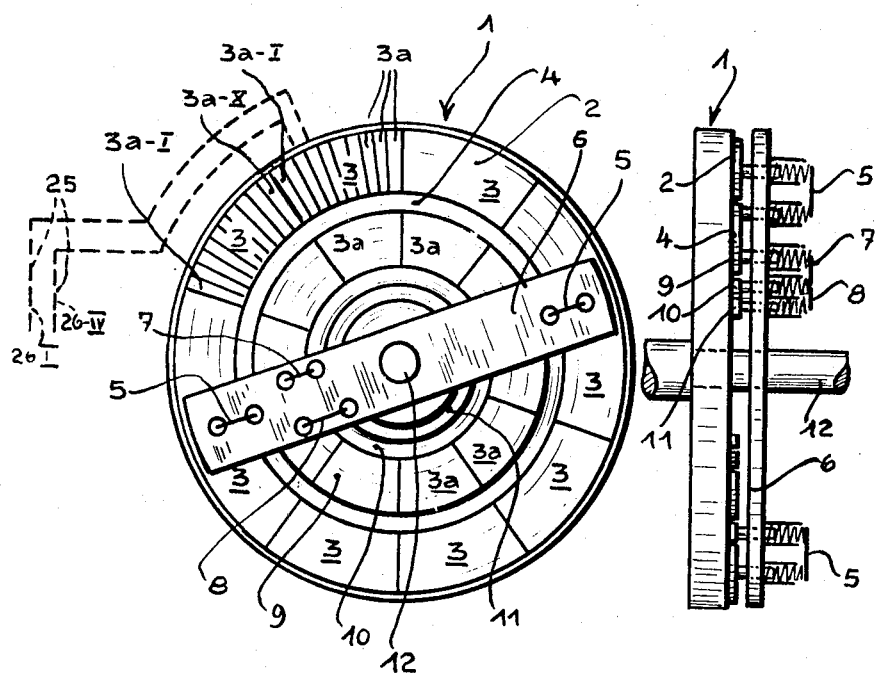
FIG. 1 is a schematic representation of the commutator disc of the stereoscopic apparatus with the curser shown in front view and side view.

A commutator disc 1 as shown in FIG. 1 is provided with a number of contact plates 3a arranged in an outer circular ring 2, which contact plates are connected with each other in groups of 10 and provide a sector 3. The circular ring 2 comprises 10 such sectors 3. A first sliding ring 4 is attached to the outer circular ring 2. A sliding contact 5 of a cursor 6 which is pivoted rotatably around the central axis of the commutator disc 1 connects the first sliding ring 4 with the respective contact plate 3a of the outer circular ring 2.

Correspondingly, further sliding contacts 7 and 8 are provided on the inner radius of the cursor 6. These sliding contacts 7 and 8 respectively connect the contact plates 3a of an inner circular ring 9 with a second sliding ring 10 and a third sliding ring 11. The axis of rotation of the commutator disc 1 and of the cursor 6 is indicated at 12. The inner circular ring 9 is provided with 10 contact plates 3a.

If the first sliding ring 4 is used, the height as adjusted by a height measuring device is transmitted in a scale of 1:10. The transmission over the contacts 7 and 8 occurs in a scale of 1:1. The cursor 6 is mechanically coupled to an adjusting disc for heights of the stereoscopic apparatus.

Ten lines 25 are provided which are connected each with one socket 26. The first contact plate 3a of each sector 3 of the outer circular ring 2 is connected with the first socket 26–I, the second contact plate 3a of each sector 3 with the second socket 26–II and so on. Accordingly, the first contact plate 3a of the inner circular ring 9 is connected with the first socket 26–I, the second contact plate 3a with the second socket 26–II and so on.

Figure 2:
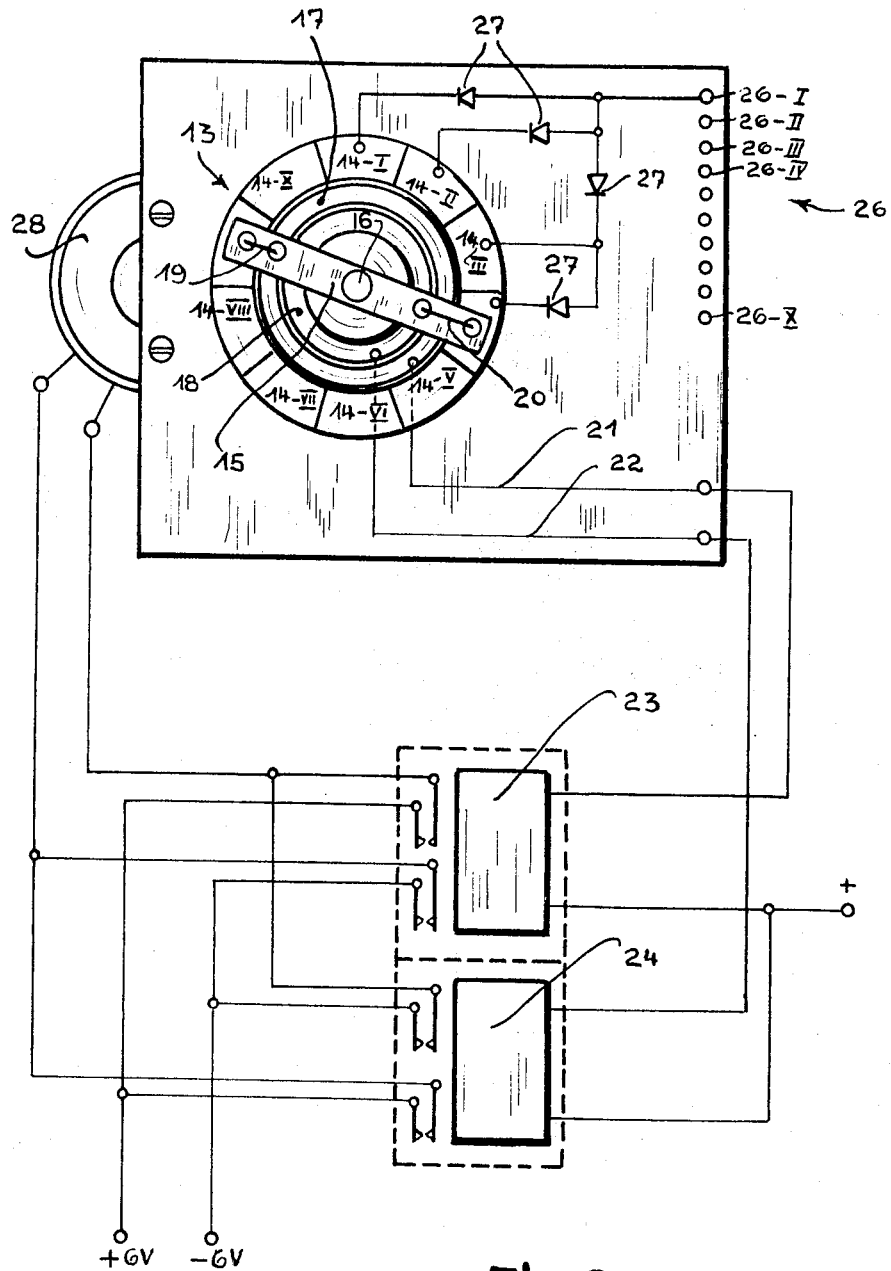
FIG. 2 is a front view of the receiving commutator with the first electromotor and the corresponding connections.

The corresponding receiving commutator 13 is shown in FIG. 2. It is also provided with contact plates 14 and a cursor 15 which rotates around a common axis of rotation 16. An outer sliding ring 17 and an inner sliding ring 18 are connected to the contact plates 14. The sliding contacts 19 and 20 connect the contact plate 14 placed below them with the inner or outer sliding rings 17 and 18. Both these sliding rings are subjected to the voltage in the lines 21 and 22 through relays 23 and 24.

To the right of the receiving commutator 13, 10 sockets 26 are shown which are attached to the lines 25 from the commutator disc 1. For the sake of simplicity, only the lines and diodes of the first socket 26 are shown. As the commutator disc with its circular ring 2 comprises 100 contact plates 3a connected together in groups of 10, 10 lines 25 lead to the 10 sockets 26. One or two of these 10 sockets are steadily subjected to voltage. In the illustrated embodiment, the second socket 26–II is subjected to voltage. This voltage is transmitted through diodes 27 to the four contact plates 14–II to 14–V. A first electromotor 28, mechanically coupled with the cursor 15, receives in the example as shown in FIG. 2, the voltage over the contact plate 14–IV, the sliding contact 20, the line 22 and the relay 24. This relay 24 with two working contacts is activated so that the electromotor 28 rotates to the right, until the cursor 15 has left the sectors IV and V. At this moment the relay is disconnected at once, so that the motor stops.

If, on the contrary, the sliding contact 19 was energized over one of the sectors 14, for instance sector IX, the electromotor 28 would rotate simultaneously with the cursor 15 in the counterclockwise direction as viewed in FIG. 2, until this cursor is positioned over a sector 14 without voltage.

The cursor 15 and the electromotor 28 fastened to it thus avoid the sector 14 which presently conducts current. As the distribution of the current is determined by the angle of rotation of the cursor 6 (FIG. 1), the electromotor 28 is continuously in a position which corresponds to the position of the cursor 6 and thus the elevation measuring scale.

By switching over, the outer circular ring 2 or the inner circular ring 9 may be optionally connected with the receiving commutator 13, whereby the cursor 15 of the receiving side follows the cursor 6 of the transmitting side respectively in a scale of 1:10 or 1:1.

Figure 4:
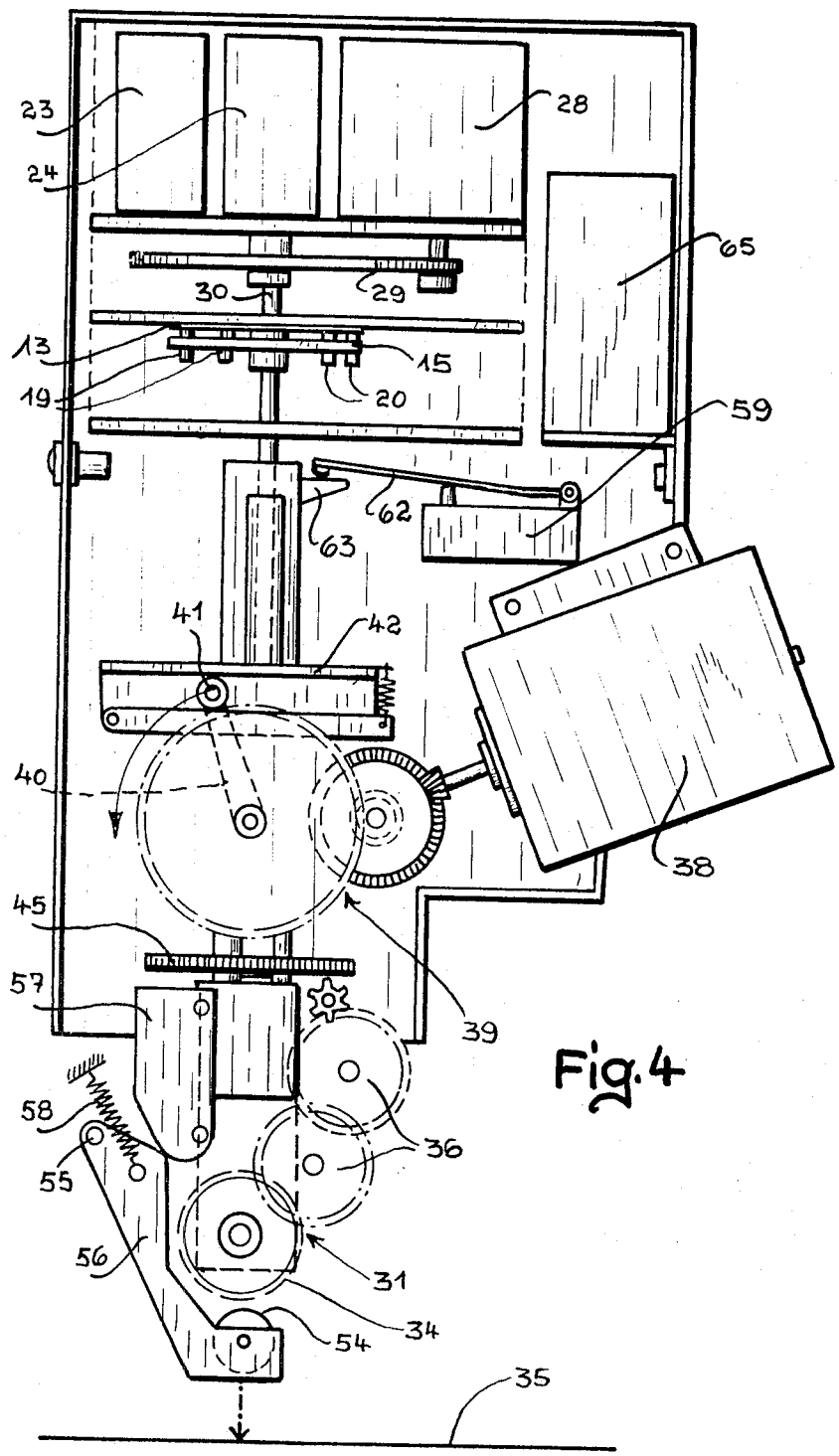
FIG. 4 is a side elevational view of the mechanical part of the indicating device with the printing head.

The first electromotor 28 is also shown in FIG. 4. It drives the cursor 15 and a reciprocable gimbal suspension 30 which transfers the rotation of the motor 28 to a register 31 over a transmission 29, which has a reduction factor of 3:1.

It can be seen from FIG. 5 that the gimbal suspension 30 drives a shaft 33 by means of a pair of bevel gears 32, the shaft 33 supporting four numeral wheels 34. These numeral wheels are basically of the same construction as the wheels of a tachometer, however, they rotate during the reverse movement too. These numeral wheels form the actual printing device, which prints the measured and transmitted value on the map 35.

It can be seen in FIGS. 6 and 7 that the numeral wheels 34 actuate through gear wheels 36 an evaluating apparatus 37 which takes care of the forwarding of the decimals.

When the number is printed, a period is printed between the last numerals to separate the ones from the tenths. Simultaneously indicated are the x- and y-coordinates of the printed elevation location.

The second electromotor 38 drives the printing movement. As soon as the electromotor 38 is activated by a releasing button, a guiding stem 40 is driven by a transmission 39 which has a reduction ratio of 36:1, and the diverted end of which follows a guiding passageway 42 by means of a roller 41. The actual printing head is fastened to the guiding passageway 42 and is moved by means of a guiding part 43 in the direction of the double arrow 44 (FIG. 5) in the printing position and back in its starting position again, as soon as the guiding stem 40 has rotated through an angle of 360°.

The ratchet wheel 45 with 10 teeth is non-rotatably fastened to the gimbal suspension. The teeth of the ratchet wheel come into contact with a resilient pin 46 during the printing movement, whereby the ratchet wheel is moved into the correct position.

A two armed lever 47 with a pivot axis 48 is seen in FIG. 7, wherein one of the arms of the lever is provided with a locking handle 49 which is inserted into the spaces of the four numeral wheels 34 shortly before the lower printing position. A guiding stem 51 is mounted in a bore 50 of the other arm of the lever, which is also shown in FIG. 5. On this guiding stem, a spring 52 is mounted which rests upon the head 53 of the guiding stem 51 as soon as the printing head reaches its lower position. In this position, the arm of the lever 47 with the bore 50 is pulled upwardly, whereby the setting head 49 is moved to engage the numeral wheels 34 and moves them into the correct position.

A felt roller 54 saturated with ink is shown in FIG. 4, and is mounted on a bearing support 56 which is tiltable around an axle 55. During the printing, the felt roller 54 with its bearing support 56 is moved aside by means of a curved cam 57 so that the numeral wheels 34 are not obstructed when printing. An extension spring 58 moves the bearing support 56 backwardly after the printing and presses the felt roller against the numeral wheels 34.

The self holding of the second electromotor 38 is shown in FIGS. 3 and 4. If the guiding part 43 is moved slightly downwardly, the contact 60 is opened by means of the switch 59 and the contact 61 is closed. This switching over is caused by a resilient arm 62 of the relay. Shortly before the starting position is reached during the upward movement, the relay arm 62 is moved into its original position by means of a rod 63.

From the wiring diagram of FIG. 3 it is evident that the electromotor 38 remains energized as long as the contact 61 is closed.

The releasing of the motor 38 is caused by the contact 64, which simultaneously operates the lifting magnet 65 for the drawing pen.

By the contact 60 which is open during the printing movement, it is achieved that the synchronous part with the first electromotor 28 cannot be moved during this time.

What is claimed is:

1. A device for printing on a map the elevation coordinate of a cartographic location in a stereoscopic apparatus, said device comprising a first electric motor, first means having an input for receiving a measured elevation coordinate and coupled to the motor to drive the same by an amount related to the measured coordinate, said first means comprising a rotatable commutator disc including contact plates coupled with the motor so that the latter will follow rotation of the commutation disc, printing means for printing on a map the measured elevation coordinate, and second means coupling said printing means with said motor to follow the rotation of the motor and adapt the printing means to print the measured coordinate in response thereto.

2. A device as claimed in claim 1 comprising a second motor coupled to said printing means for operating the same.

3. A device as claimed in claim 2 wherein said second means comprises a commutator disc with contact plates driven by the first motor and controlling the printing means, each commutator disc including a concentric rotatable cursor with sliding contacts which energizes the contact plates, the first said disc electrically coupling the first motor with the cursor of the second commutator disc.

4. A device as claimed in claim 3 wherein the contact plates of the first commutator disc are equally spaced from each other and are electrically connected.

5. A device as claimed in claim 4 wherein the first commutator disc is provided on its perimeter with 100 contact plates in groups of 10 sectors, wherein the contact plates which are positioned at the same place in respective sectors are electrically connected with each other.

6. A device as claimed in claim 5 wherein the electrically connected contact plates of the first commutator disc are connected to associated contact plates of the second commutator disc.

7. A device as claimed in claim 5 wherein the first commutator disc has inner and outer circumferential rings, each with 100 contact plates in groups of 10 sectors.

8. A device as claimed in claim 7 wherein the second commutator disk is provided with 10 contact plates of which four neighboring plates are electrically connected to each other and respectively to contact plates of the outer circumferential ring and to one contact plate of the inner circumferential ring of the first commutator disc.

9. A device as claimed in claim 8 wherein the second commutator disc is provided with at least two sliding rings each connected to the contact plates of the second disc and associated with a different direction of rotation of the first motor.

10. A device as claimed in claim 3 comprising switch means for operating the printing means from the second motor, said switch means including an operating switch and a self holding circuit for keeping the second motor energized until a printing operation is completed.

11. A device as claimed in claim 10 wherein said printing means comprises a reciprocable printing head, a guiding stem with a fixed axis of rotation rotatably driven by said second motor and a transmission means coupled to the printing stem and said printing head to move the printing head from a starting position to a printing position during one rotation of the stem.

12. A device as claimed in claim 11 comprising change over switch means operated at the beginning of the movement of the printing head to hold the second motor energized until the printing head has reached its starting position.

13. A device as claimed in claim 12 wherein said printing means comprises a pivotal printing register with wheels and means for adjusting the position of said register including a ratchet wheel fastened to the axis of rotation of the register and a resilient pin extending between the teeth of the ratchet during the printing operation to move the axis of rotation to an exact printing position.

14. A device as claimed in claim 13 comprising a two arm correcting lever attached to said printing head, for correcting the position of the wheels of the register, a setting head attached to one of the arms of the lever to adjust the lever and correct the position of the wheels before the printing position is reached, a guide stem connected to the other arm of the lever and spring means acting on said stem to urge the lever in opposite direction as the setting head before the printing position is reached.

15. A device as claimed in claim 12 wherein said printing means comprises a tiltable stamping pad mounted below the register, and means for pivoting the pad out of the path of the register during the printing operation.

16. A device as claimed in claim 12 wherein the printing means comprises secondary wheels and a transmission coupling the secondary wheels with the wheels of the register to effect setting of decimals.

* * * * *